(12) United States Patent
Johannsen et al.

(10) Patent No.: US 8,360,535 B2
(45) Date of Patent: Jan. 29, 2013

(54) SOUND REDUCING SEGMENTED IDLER FOR TRACK-TYPE VEHICLES

(75) Inventors: Eric J. Johannsen, Washington, IL (US); Daniel D. Angot, Peoria, IL (US); Ming Zhang, Spring, TX (US); Xiangyang Jiang, Dunlap, IL (US); Constant B. Bissahoyo, Peoria, IL (US); Alexander H. Hays, Peoria, IL (US); Anthony Snyder, Canton, IL (US)

(73) Assignee: Caterpillar Inc., Peoria, IL (US)

( * ) Notice: Subject to any disclaimer, the term of this patent is extended or adjusted under 35 U.S.C. 154(b) by 268 days.

(21) Appl. No.: 12/616,224

(22) Filed: Nov. 17, 2009

(65) Prior Publication Data

US 2010/0133898 A1 Jun. 3, 2010

Related U.S. Application Data

(60) Provisional application No. 61/119,070, filed on Dec. 2, 2008.

(51) Int. Cl.
*B62D 55/096* (2006.01)

(52) U.S. Cl. .................................. 305/137; 305/194

(58) Field of Classification Search ............... 305/136, 305/137, 194, 199; 295/7, 11
See application file for complete search history.

(56) References Cited

U.S. PATENT DOCUMENTS

| | | | | |
|---|---|---|---|---|
| 2,065,134 | A | | 12/1936 | Hirshfeld |
| RE23,161 | E | | 10/1949 | MacLean |
| 2,536,344 | A | * | 1/1951 | Bean ................................ 105/54 |
| 3,797,895 | A | * | 3/1974 | Tomizawa ..................... 305/136 |
| 3,937,528 | A | | 2/1976 | Clemens et al. |
| 3,958,837 | A | | 5/1976 | Chagawa |
| 3,993,356 | A | | 11/1976 | Groff et al. |
| 4,068,698 | A | | 1/1978 | Boggs |
| 4,069,856 | A | | 1/1978 | Sogge |
| 4,752,281 | A | * | 6/1988 | Lammers ...................... 474/162 |
| 4,818,041 | A | | 4/1989 | Oertley |
| 4,881,930 | A | * | 11/1989 | Oertley ........................ 474/162 |
| 5,131,731 | A | | 7/1992 | Johnson |
| 5,207,489 | A | | 5/1993 | Miller |
| 6,012,784 | A | * | 1/2000 | Oertley ......................... 305/137 |
| 6,540,630 | B1 | * | 4/2003 | Oertley ........................ 474/162 |
| 6,631,961 | B1 | | 10/2003 | Bedford et al. |
| 6,652,043 | B2 | | 11/2003 | Oertley |
| 6,739,678 | B2 | | 5/2004 | Moebs et al. |
| 6,899,651 | B2 | * | 5/2005 | Oertley ........................ 474/162 |
| 7,032,983 | B2 | * | 4/2006 | Wu et al. ...................... 305/195 |
| 7,823,990 | B2 | * | 11/2010 | Angot .......................... 305/195 |
| 2002/0113489 | A1 | | 8/2002 | Oertley |
| 2009/0102281 | A1 | * | 4/2009 | Diekevers et al. ............ 305/104 |

FOREIGN PATENT DOCUMENTS

EP 0336590 10/1989

* cited by examiner

*Primary Examiner* — Kip T Kotter

(74) *Attorney, Agent, or Firm* — Finnegan, Henderson, Farabow, Garrett & Dunner LLP (57) ABSTRACT

An idler having an axis of rotation. The idler may include a hub with a flange. A plurality of rim members are positioned along a perimeter of the flange and have generally axially facing, opposite side surfaces. At least one of the side surfaces has a first interlocking formation. A clamping plate is connected to the flange. The clamping plate has a second interlocking formation coupled with the first interlocking formation. A dampening member interposes the first and second interlocking formations.

17 Claims, 13 Drawing Sheets

FIG. 13

SOUND REDUCING SEGMENTED IDLER FOR TRACK-TYPE VEHICLES

CROSS-REFERENCED TO RELATED APPLICATIONS

This application claims benefit of U.S. Provisional Application No. 61/119,070 filed Dec. 2, 2008.

TECHNICAL FIELD

This disclosure relates generally to a tracked undercarriage, and more particularly, to an idler of the track undercarriage that provides sound suppression.

BACKGROUND

Operator comfort and noise regulations require reducing the sound decibel level emanating from a track-type machine. A source of noise in earth moving and construction track-type machines originates from the endless track chains as they revolve around and make contact with undercarriage components of the track-type machine. Idler wheels are used to guide and support portions of the track chains. Since these components are manufactured using metal, noise and vibration is generated between the track chains and the idler wheels during operation. This noise is then transmitted to, and typically amplified by, the hub of the idler wheel and the track chain. Generally speaking, center tread idlers can produce more noise than standard idlers.

One type of idler used for suppressing sound is disclosed in U.S. Pat. No. 4,818,041 issued to Thomas E. Oertley and assigned to Caterpillar Inc. In this patent, an idler includes a hub, wear segments, rubber rings disposed between the wear segments and the hub, and clamping plates positioned about the circumference of the hub to secure the wear segments and rubber rings to the hub.

SUMMARY OF THE DISCLOSURE

In one aspect of the disclosure, an idler having an axis of rotation is provided. The idler may include a hub with a flange. A plurality of rim members may be positioned along a perimeter of the flange and have side surfaces. At least one of the side surfaces may have a first interlocking formation. A clamping plate may be connected to the flange. The clamping plate may have a second interlocking formation joined with the first interlocking formation. A dampening member interposes the first and second interlocking formations.

In another aspect of the disclosure, an idler for a track-type undercarriage including a track comprising interconnected track links and bushings associated with the track links and positioned to contact the idler is provided. The bushings may be separated from each other along the track by a track pitch. The idler generally comprises a hub with a flange. Arcuate rim members may be arranged generally around a perimeter of the flange and secured to the flange. Each arcuate rim member may have a bearing surface with a chordal length less than or equal to the track pitch.

In yet another aspect of the disclosure, a rim element for an idler may include a rim member having a bearing surface and side surfaces extending from the bearing surface. The side surfaces may be directed generally axially when the rim element is mounted on the idler. The side surfaces may have an interlocking formation including one of a protrusion and a recess. The side surfaces may also have a locking surface. A dampening member may be fixed to at least one of the side surfaces of the rim member for engaging the idler.

DETAILED DESCRIPTION

Figure 1:
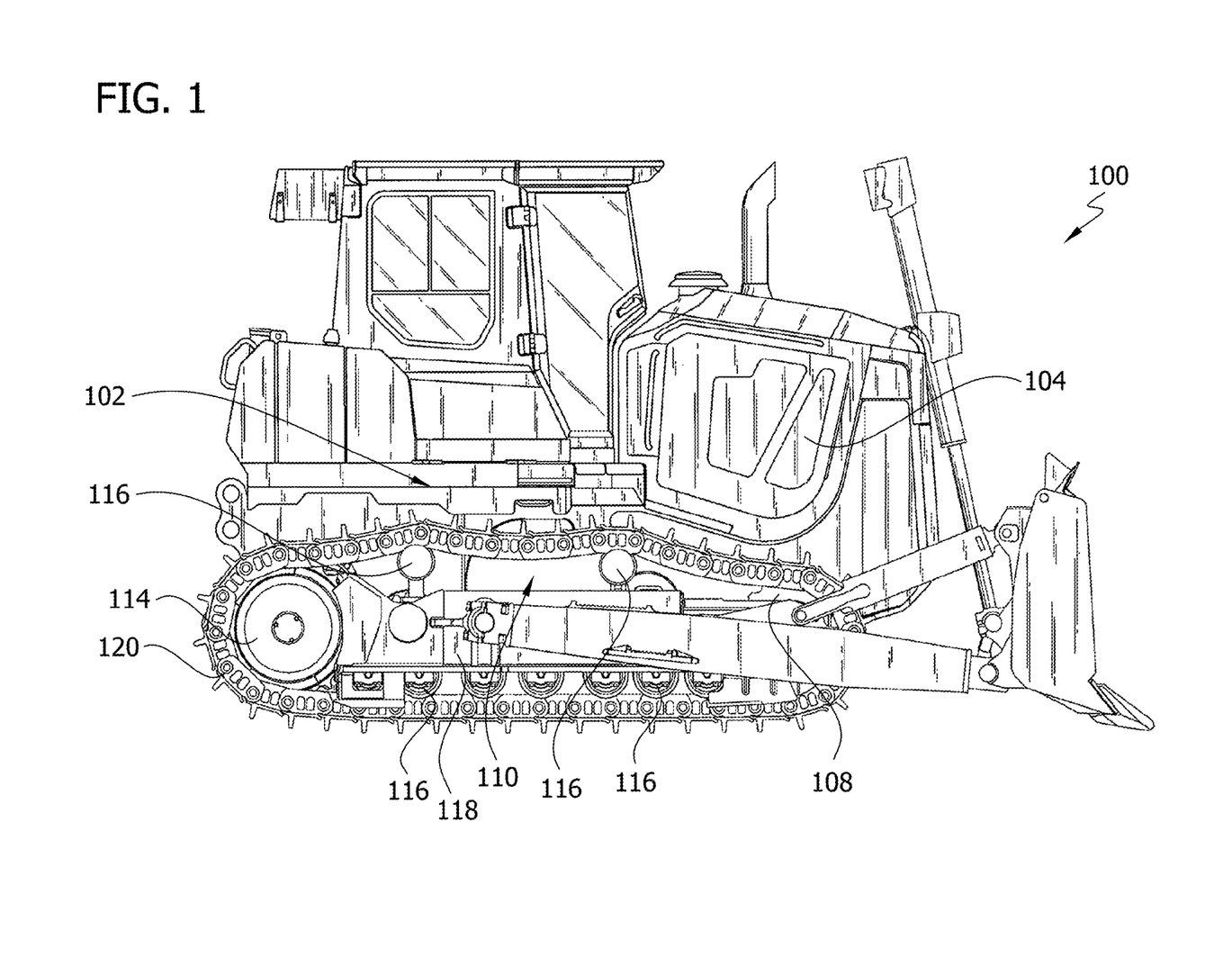
FIG. 1 is a diagrammatic view of a track-type machine.
Figure 2:
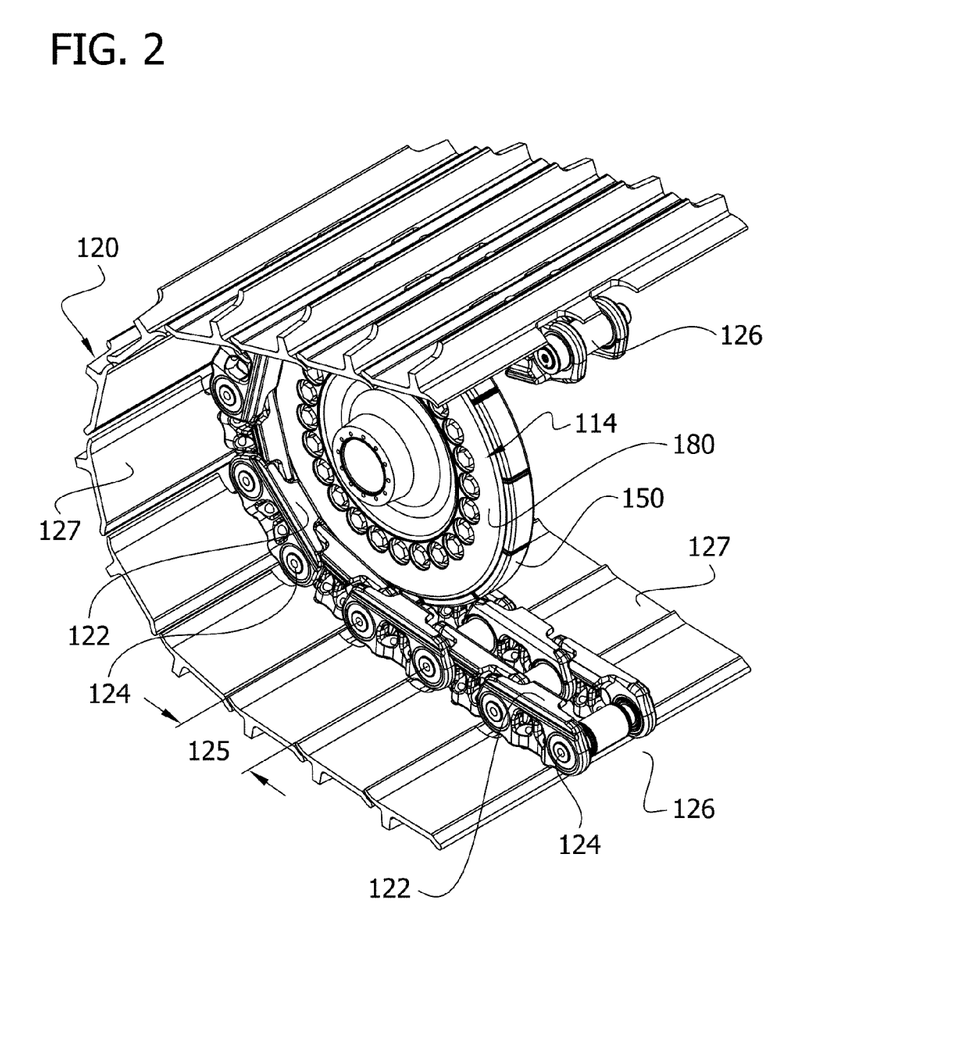
FIG. 2 is an enlarged fragmentary perspective of the track-type machine with parts removed to illustrate the engagement between a track and an idler.

Referring to the drawings, specifically FIGS. 1 and 2, a track-type machine 100 may include a chassis 102 supporting a housing 104. The track-type machine 100 is capable of driving drive sprockets 108 (only one side shown) on the sides of the chassis 102. An undercarriage generally indicated at 110, may include idlers 114 (only one side shown), guide rollers 116, and a track roller frame 118 supporting a continuous track chain 120. The track chain 120 may be entrained around the drive sprocket 108, the idler 114 and the guide rollers 116. The track chain 120 may have track links 122 pivotally connected to each other by track pins 124. The track pins 124 may be received in bushings 126. Track shoes 127 may be fixed to the track links 122.

The idler 114 may be a center tread idler, thus, the bushings 126 contact the idler 114 as the track chain 120 passes over the idler 114. The length between adjacent track pins 124 and bushings 126 is defined as the track pitch 125, measured from central axis to central axis of adjacent track pins 124. The idler 114 may be rotatably attached to the track roller frame 118, rotating about an axis of rotation 119 (see FIG. 3).

Figure 3:
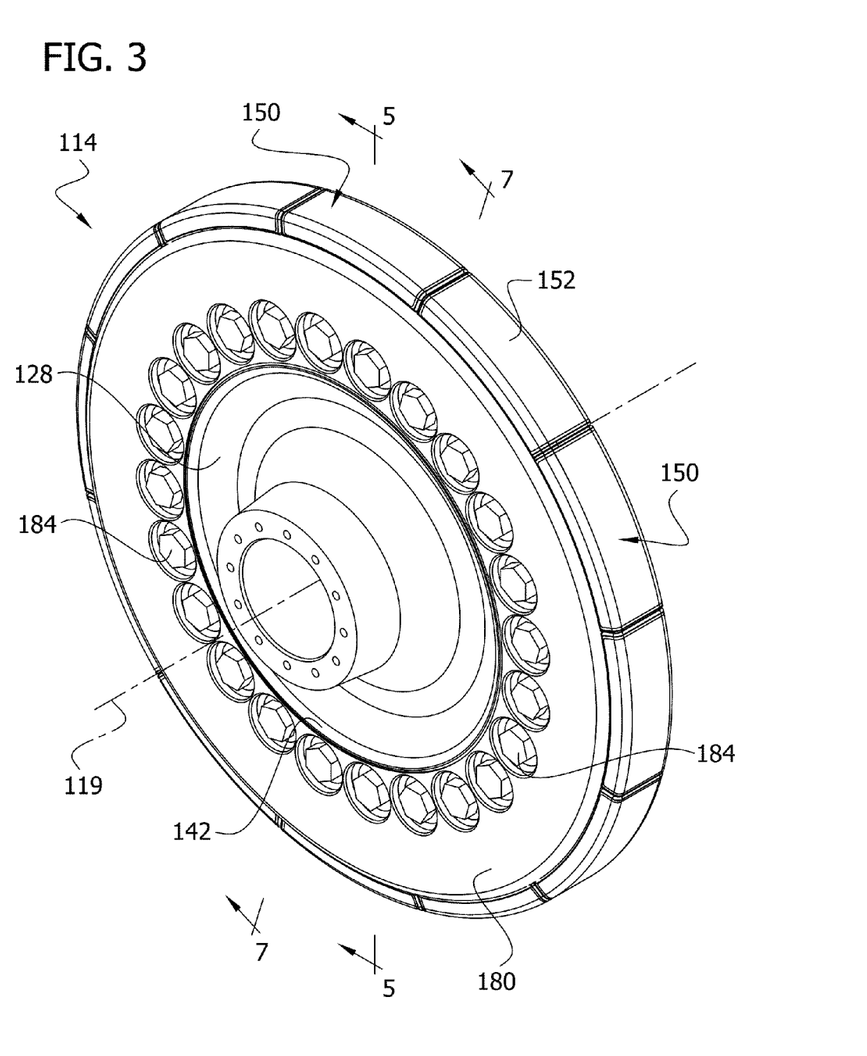
FIG. 3 is a perspective of the idler of the track-type machine.
Figure 4:
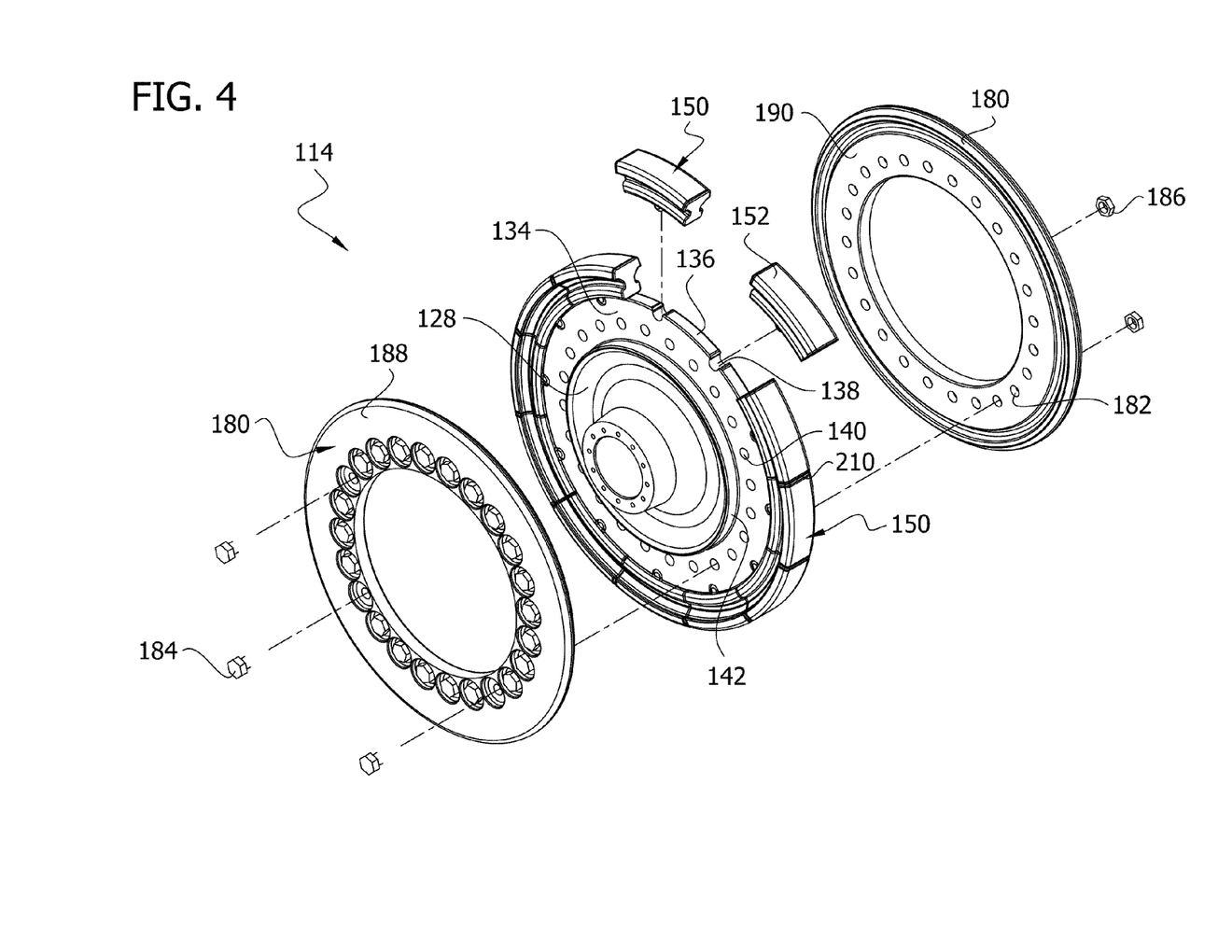
FIG. 4 is an exploded perspective of the idler.
Figure 5:
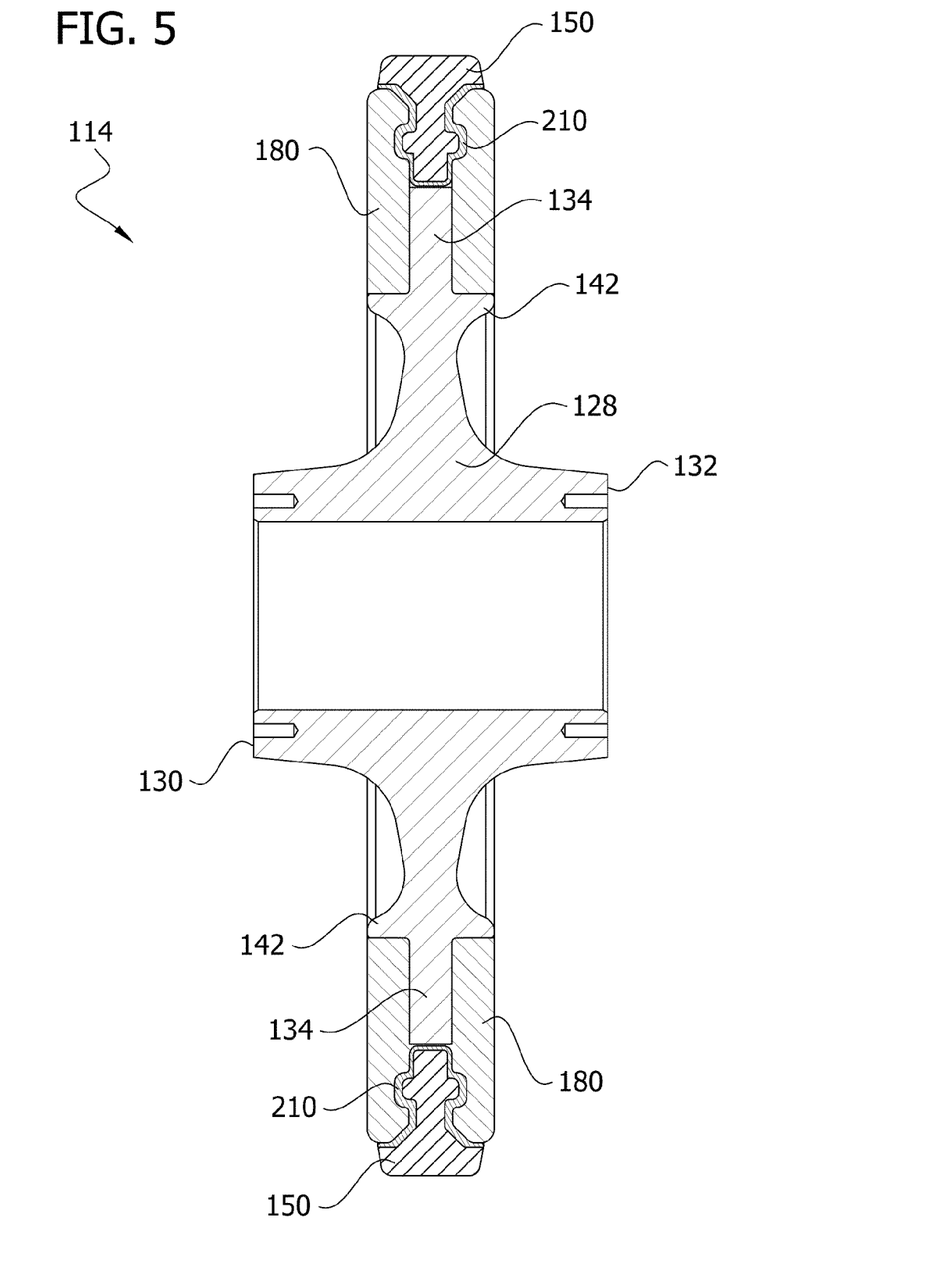
FIG. 5 is a section of the idler showing a rim member and clamping plates taken through a plane including line 5-5 of FIG. 3.

As shown in FIGS. 3-5, the idler 114 may include a hub 128. The hub 128 may have first and second sides 130, 132 and a flange 134. The flange 134 may be annular having a perimeter 136 and a plurality of second connector elements 138 disposed in the perimeter 136. The second connector elements 138 may be radially opening recesses as shown in FIG. 4. A plurality of axial openings 140 in the flange 134 may be arranged in a circle about the axis of rotation 119. A pair of annular ribs 142 on the first and second sides 130, 132 of the hub 128, respectively, may extend axially outward from the hub 128. Together, the flange 134 and the ribs 142 may form an "inverted T" when viewed in cross section. FIG. 5 depicts the flange 134 and ribs 142 as integral with the hub 128. Alternatively, the flange 134 and ribs 142 could be configured as separate pieces and attached to the hub 128. Also, the ribs 142 could extend at an angle to the hub 128 or be completely omitted from the idler 114.

Figure 6:
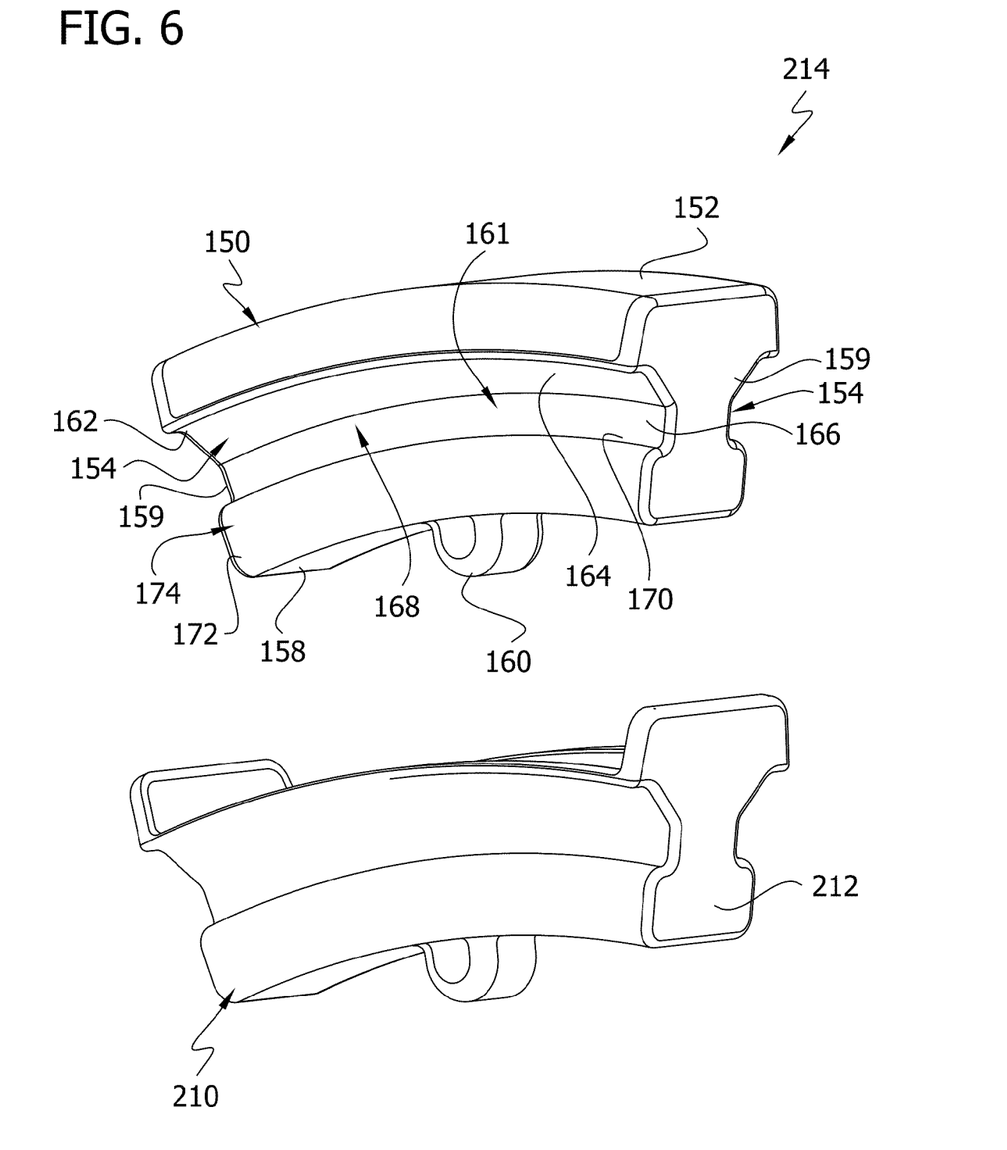
FIG. 6 is an exploded perspective of a rim element.
Figure 7:
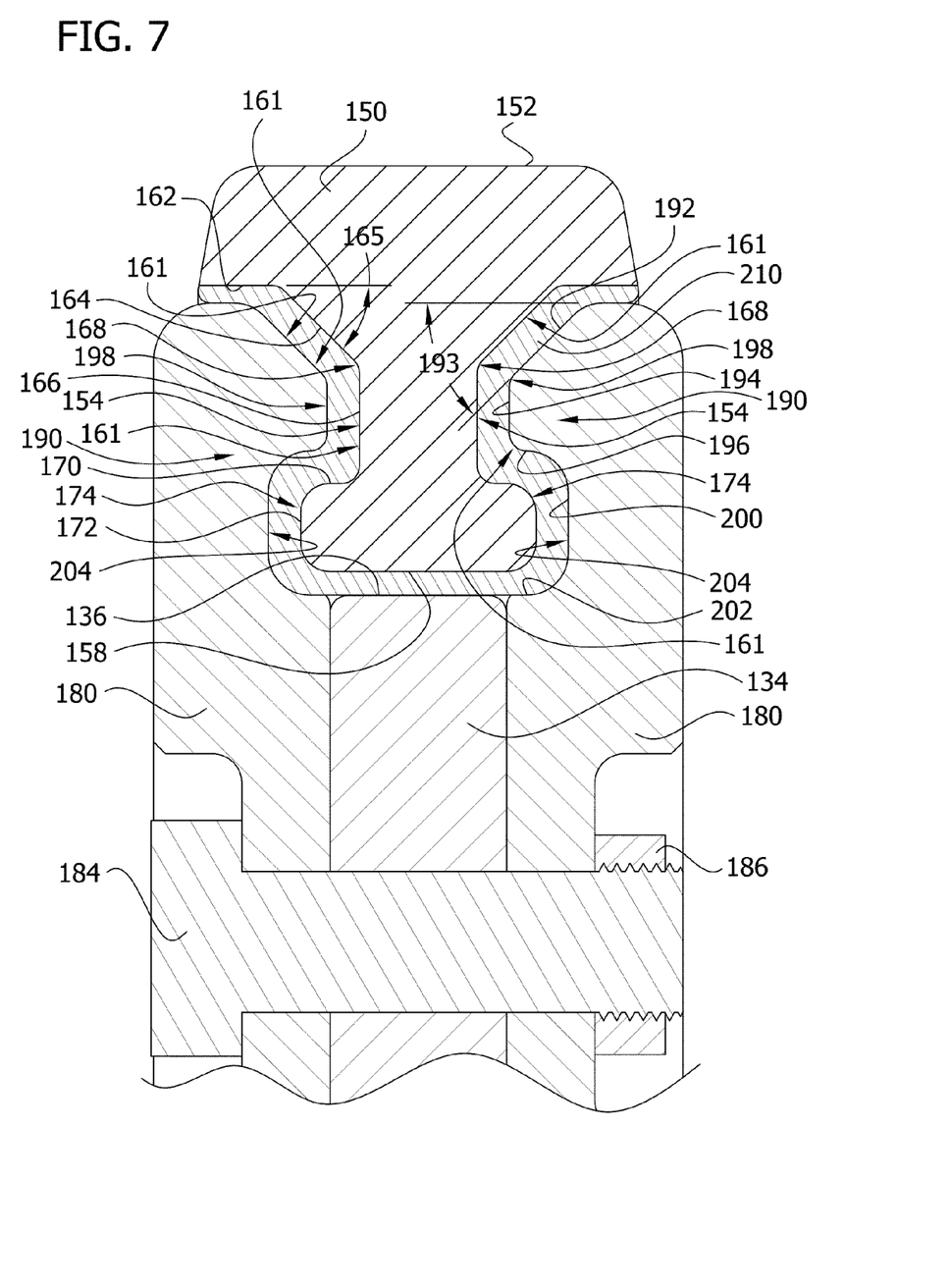
FIG. 7 is an enlarged fragmentary section of the idler taken through a plane including line 7-7 of FIG. 3.
Figure 11:
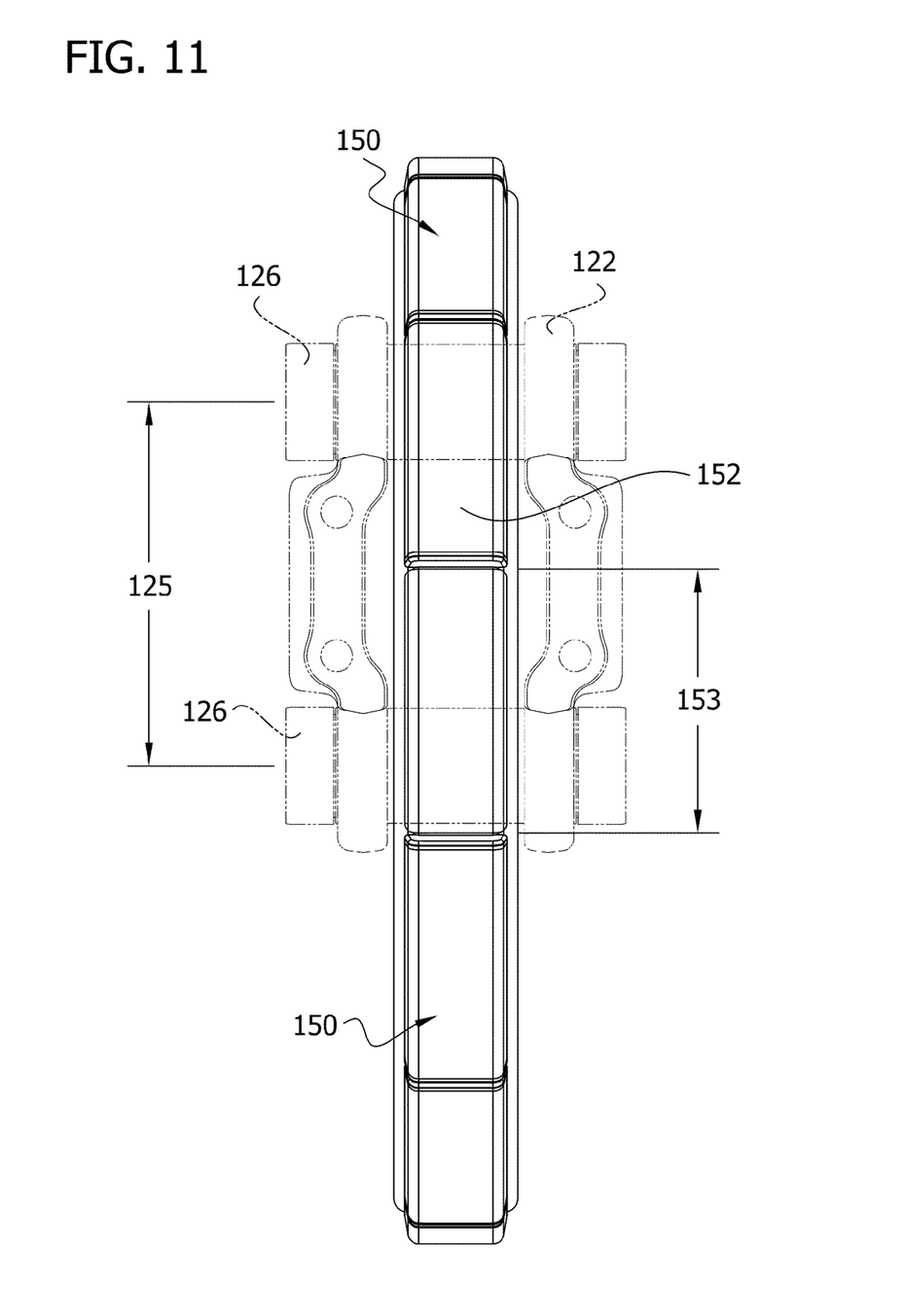
FIG. 11 is a front elevation of the idler with a hub removed and a link of the track shown in phantom.

Referring to FIGS. 6 and 7, a plurality of rim members 150 may be arranged around the perimeter 136 of the flange 134. The rim members 150 may each have a bearing surface 152, side surfaces 154, an inner surface 158, and end surfaces 159. The bearing surface 152 may have an arcuate shape that has a chordal length 153 (see FIG. 11) extending from one end surface 159 of the bearing surface 152 to the other end surface 159 of the bearing surface 152. When the idler 114 is assembled, the inner surface 158 faces the flange 134 of the hub 128. A first connector element 160 may project inward from the inner surface 158. The first connector element 160 may be configured as a tab as shown in FIG. 6.

The side surfaces 154 may include an interlocking formation 161 that may be used to secure the rim member 150 as part of the idler 114. Together, a locking surface 170, a second side portion 172, and an inner surface 158 form a first protrusion 174. In the illustrated embodiment of FIG. 7, the first protrusion 174 and the first recess 168 may be considered individually or collectively the interlocking formation 161. More specifically, the interlocking formation 161 may include a shoulder 162 on the side surfaces 154 located near the bearing surface 152. A transition surface 164 may extend radially and axially inward from the shoulder 162 at an angle 165. As depicted in FIG. 7, angle 165 may be about 45 degrees with respect to a line parallel to the axis of rotation 119. In one configuration, the angle 165 may be less than or equal to 65 degrees with respect to the axis of rotation of the idler. In other configurations, angle 165 may range between 35 degrees and 55 degrees. However, it is envisioned that the transition surface 164 may extend inward at an angle between 0 and 90 degrees without departing from the disclosure. A first side portion 166 may extend radially inward from the transition surface 164, generally perpendicular to the axis of rotation 119. Together, the transition surface 164 and the first side portion 166 form the first recess 168. A locking surface 170 may extend axially outward from the first side portion 166, generally parallel to the axis of rotation 119. A second side portion 172 may extend radially inward from the locking surface 170 generally perpendicular to the axis of rotation 119. The inner surface 158 may extend axially from the second side portion 172, generally parallel to the axis of rotation 119.

Alternatively, the side surfaces 154 may have different constructions. For example, the side surfaces 154 may also be curved rather than straight as depicted in FIG. 7. Further, the interlocking formation 161 may alternatively occupy a small portion of the side surface 154, instead of the full length of the side surface 154. Additionally, the side surfaces 154 may include multiple angled steps to increase the surface area of the side surfaces 154. The side surfaces 154 of the rim member 150 may have the same construction as shown in FIG. 7. For clarity only the first recess 168 and the first protrusion 174 defined by the right side surface 154 are labeled in FIG. 7.

Figure 8:
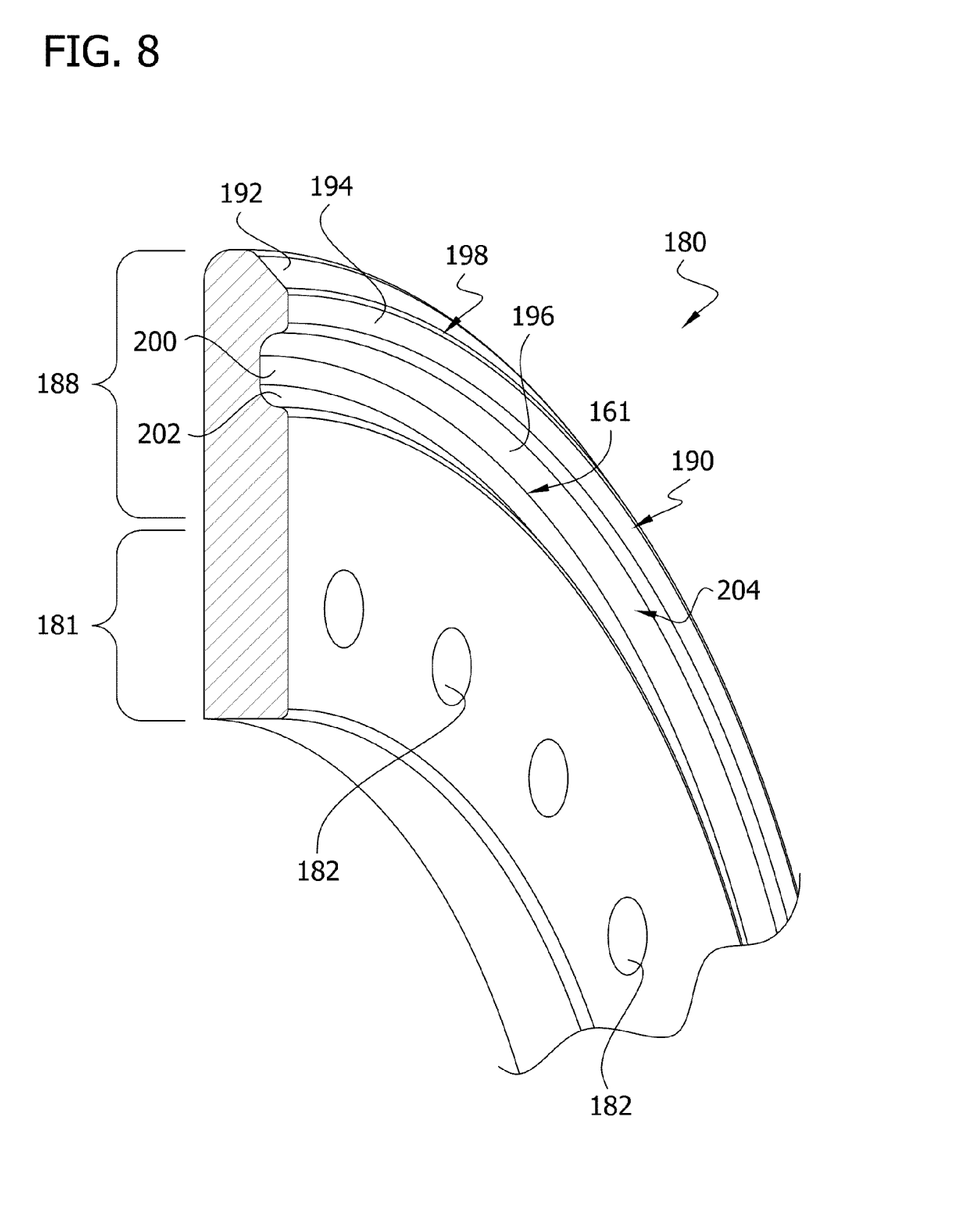
FIG. 8 is a fragmentary perspective of the clamping plate.

Referring to FIGS. 7 and 8, clamping plates 180 may be connected to the flange 134 in a suitable manner to clamp the rim members 150 to the hub 128. The clamping plates 180, in one example may be annular members mounted on the side surfaces 154 of the rim members 150. The clamping plates 180 are supported against radially directed loads by the ribs 142 (see FIG. 5). The ribs 142 transfer the radially directed loads from the clamping plates 180 to the flange 134. Attachment of the clamping plates 180 to the flange 134 may be accomplished at a mounting portion 181, in part, by a plurality of bolt holes 182 that are positioned axially around the clamping plates 180. The bolt holes 182 may be aligned with the flange openings 140 on the flange 134 for attaching the clamping plates 180 to the hub 128. Bolts 184 may be received through the bolt holes 182 and the flange openings 140 and secured by nuts 186. One result of the radial support given to the clamping plates 180 by the ribs 142 may be to shield the bolts 184 from shearing forces that may damage the bolt shafts.

To account for machining deviation, a shim (not shown) may be added between the ribs 142 and the clamping plates 180. The shim may be different thicknesses to account for the gap between the outer surface of the ribs 142 and the inner diameter of the clamping plates 180 that results from inherent errors in the machining process. The shim allows the clamping plates 180 to engage the ribs 142 so that the ribs 142 may transfer the radially directed loads from the clamping plates 180 to the flange 134.

Figure 9:
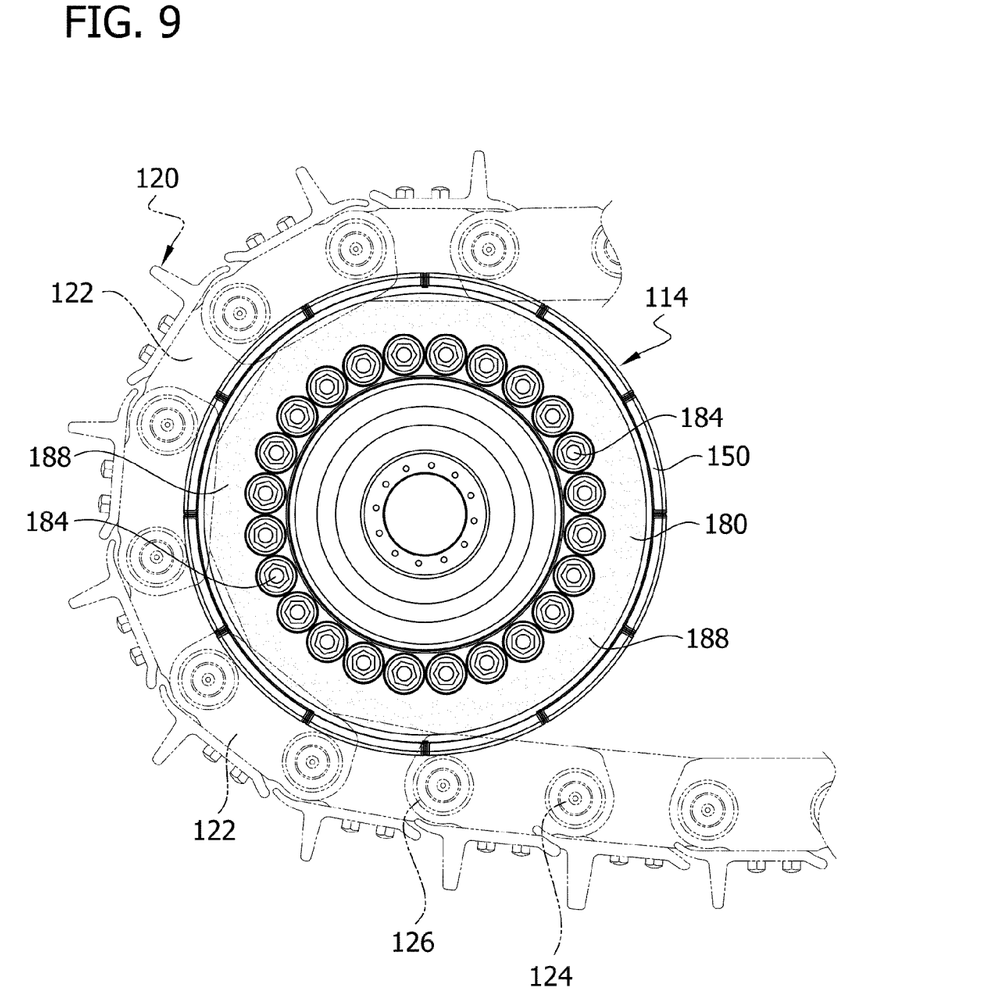
FIG. 9 is a right side view of the perspective of FIG. 2 with the track of the track-type machine shown in phantom.

Referring to FIGS. 7-9, the clamping plates 180 may include a wear portion 188 (also indicated by hatched area in FIG. 9) that abuts and may be partially worn away by the track links 122. A clamping portion 190 on each clamping plate 180 may join with a respective one of the side surfaces 154 of the rim members 150 to interlock the clamping plates 180 and rim members 150 such that the clamping plates 180 and rim members 150 are brought into close association with one another. The clamping portion 190 may include an interlocking formation 161 shaped to engage the interlocking formation 161 of the rim members 150. The configuration of the interlocking formation 161 for the clamping plate 180 may be a mirror image of the interlocking formation 161 of the right clamping plate 180. While several interlocking formations are disclosed herein, all of them have been give the same reference number 161. A second transition surface 192 may be arranged at an angle 193 to the axis of rotation 119 of the idler 114, and in the illustrated embodiment may be generally parallel to the transition surface 164 on the rim member 150. As depicted in FIG. 7, angle 193 may be about 45 degrees with respect to a line parallel to the axis of rotation 119. In one configuration, the angle 193 may be less than or equal to 65 degrees. In other configurations, angle 193 may range between 35 degrees and 55 degrees. However, it is envisioned that the second transition surface 192 can extend inward at an angle between 0 and 90 degrees without departing from the scope of the disclosure. A first portion 194 of the clamping portion 190 may extend radially inward from the second transition surface 192, generally perpendicular to the axis of rotation 119. A second locking surface 196 may extend axially outward from the first portion 194, generally parallel to the axis of rotation 119. Together, the second transition surface 192, the first portion 194 and the second locking surface 196 form a second protrusion 198 partially received in the first recess 168 of the rim member 150. A second portion 200 of the clamping portion 190 may extend radially inward from the second locking surface 196, generally perpendicular to the axis of rotation 119. A third portion 202 may extend axially inward from the second portion 200, generally parallel to the axis of rotation 119. Together, the second locking surface 196 and second and third portions 200, 202 form a second recess 204. The recess may partially receive the first protrusion 174 of the rim member 150. The locking surface 170 on the rim member 150 may partially oppose the second locking surface 196 on the clamping plate 180 to prevent radially outward movement of the rim member 150 with respect to the idler flange 134 and clamping plates 180. The second protrusion 198 and second recess 204 on the clamping portion 190 may be considered individually or collectively the interlocking formation 161.

Only one clamping plate 180 has been described because the other clamping plate 180 may be the same as described in the illustrated embodiment. A second protrusion 198 and second recess 204 of a clamping portion 190 of the other clamping plate 180 may be individually or collectively considered an interlocking formation 161. Alternatively, the other clamping plate may have a construction different from the clamping plate 180 described herein. For example, the other clamping plate 180 could be formed as one piece with the flange 134. Moreover, the interlocking formation 161 on the other clamping plate 180 may have a construction different than the interlocking formation 161 of the clamping plate 180 described herein.

Referring to FIGS. 4-6, a dampening member 210 may interpose the rim members 150 and clamping plates 180, the rim members 150 and the flange 134 and also adjacent rim members 150 around the perimeter 136 of the flange 134, between the end surfaces 159 of the adjacent rim members 150. In doing so, the dampening member 210 may cover the bearing surface 152, side surfaces 154 and inner surface 158. Additionally, the dampening member 210 may cover the clamping portion 190 on the clamping plates 180 and the perimeter 136 of the flange 134. As shown in FIG. 6, the dampening member 210 does not cover the bearing surface 152.

Although not shown, the dampening member may be a one-piece construction interposing the hub 128 and all the rim members 150. Alternatively, the dampening member may include a plurality of dampening member elements (not shown) placed strategically between the rim members 150, clamping plates 180 and flange 134.

Figure 10:
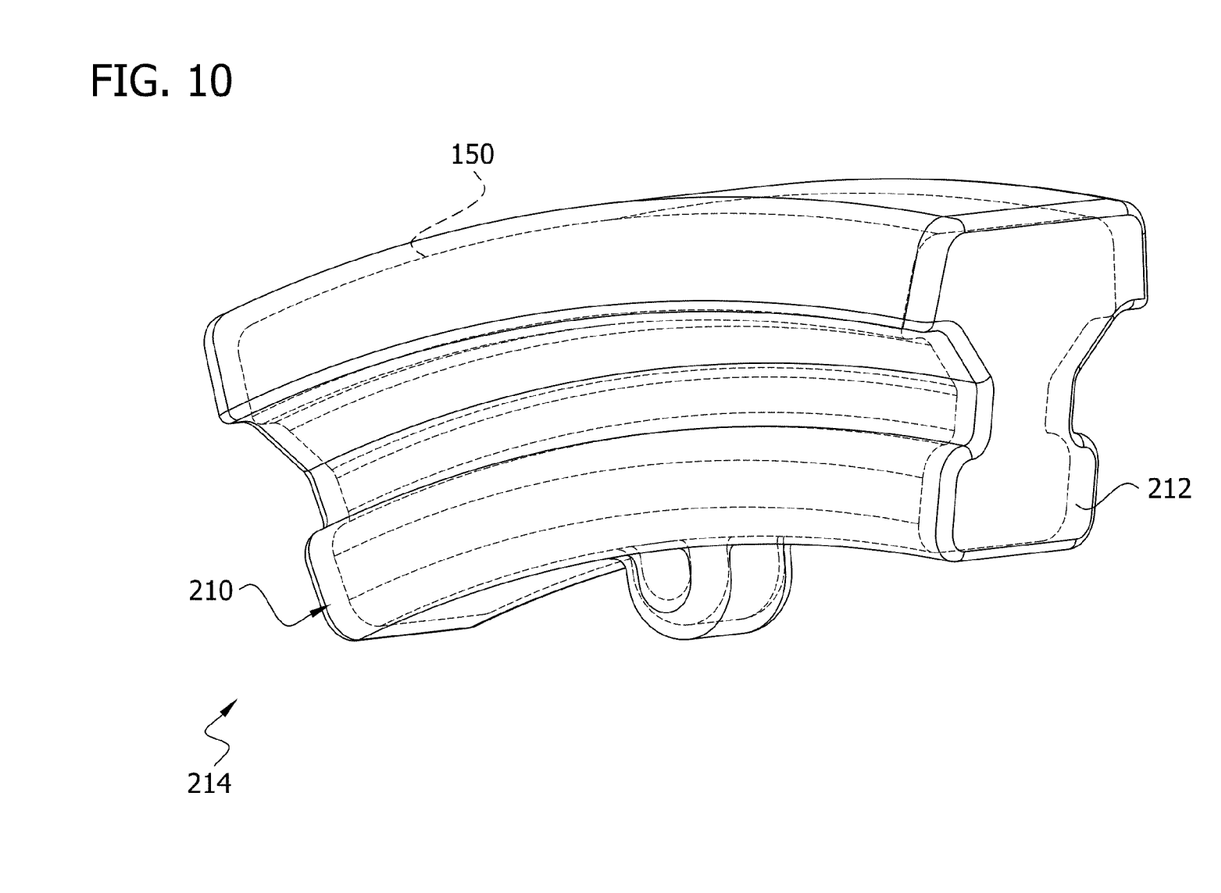
FIG. 10 is a perspective of the rim element.

Referring to FIG. 10, the dampening member 210 may encase the rim member 150. In one configuration, the rim member 150 may be overmolded by the dampening member 210. As shown in FIGS. 6 and 10, the dampening member 210 may be disposed to prevent metal-to-metal contact, which may minimize the noise that results as the bushing 126 of the track chain 120 contacts the bearing surface 152.

The dampening member 210 may include end portions 212. The end portions 212 may have the same thickness as the rest of the dampening member 210. However, in some configurations, the end portions may be thinner since the end portion 212 of a first dampening member would abut the end portion of a second dampening member, thus disposing two end portions 212 between adjacent rim members.

Rim members 150 may each be fitted, formed, and/or packaged with a dampening member 210. This arrangement is referred to herein as a rim element 214. Rim elements 214 may facilitate the assembly/and or repair of the idler 114 by removing the need to position and orient the damping members 210 between the hub 128, rim members 150, and the clamping plates 180.

The dampening member 210 may be an elastomeric material such as vulcanized rubber. The dampening member 210 can also be formed of other materials having a high Poisson's ratio and have other forms without departing from the scope of the disclosure. The dampening member 210 may be fixed in a suitable manner to the rim member 150, such as by overmolding. The dampening member 210 may also be adhered to the rim members 150. The dampening member 210 can inhibit the noise generated from operating the track undercarriage 110. The rim members 150 and dampening member 210 may also be an integrated unit.

Referring to FIGS. 8 and 9, the outer wear portion 188 (and hatched area) of the clamping plates 180 may be defined by the area of the axially facing surface of the clamping plates 180 which is engageable with the track links 122. The bolt holes 182, located at the mounting portion 181 in the clamping plates 180, may be spaced away from the wear portion 188 to avoid contact between the bolts 184 and the track links 122. This arrangement may prevent against the wear and friction on the bolt holes 182 and bolts 184 which over time may otherwise make it difficult to remove the clamping plates 180 from the hub 128.

Figure 12:
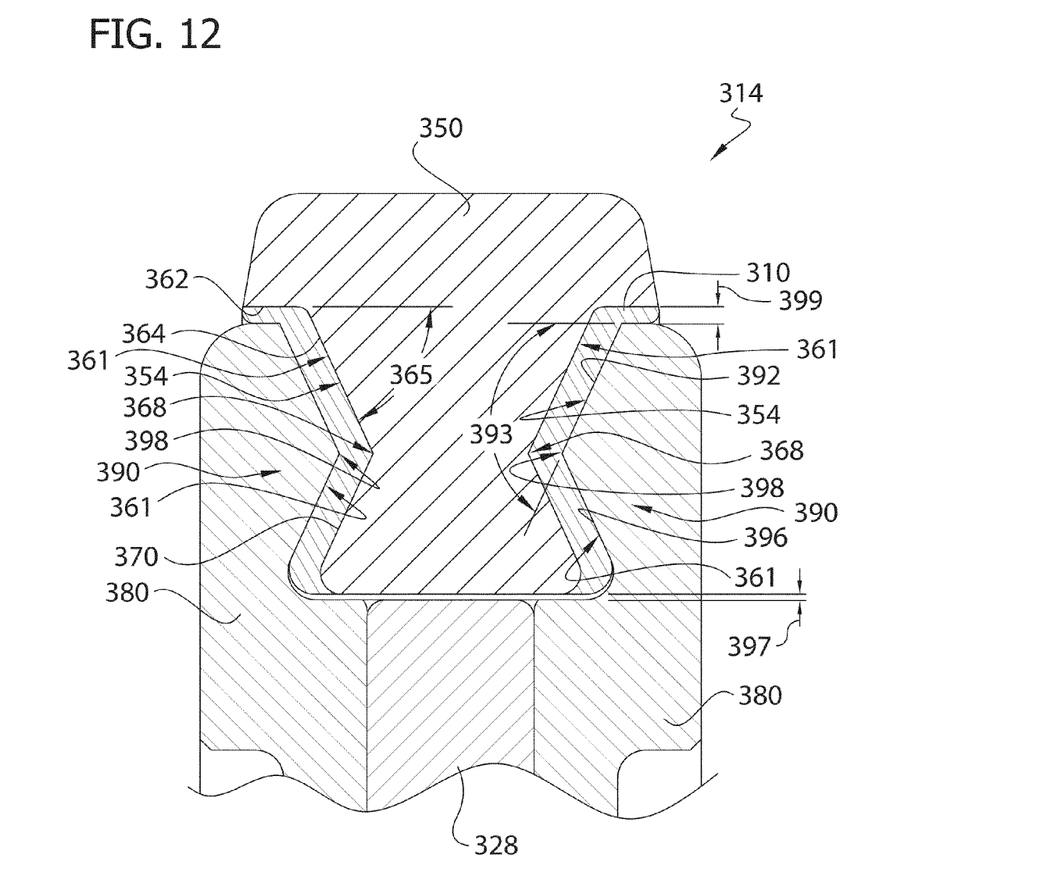
FIG. 12 is an enlarged fragmentary section of a second embodiment of the idler.

FIG. 12 illustrates another embodiment of the idler 314. The side surfaces 354 may include a transition surface 364 extending radially and axially inward from a shoulder 362. As depicted in FIG. 12, angle 365 may be equal to or less than 65 degrees with respect to a line parallel to the axis of rotation 119. In one aspect of the disclosure, the transition surface 364 may extend inward at an angle between 35 and 55 degrees. A locking surface 370 may extend radially inward and axially outward from the transition surface 364. FIG. 12 depicts the locking surface 370 may extend axially outward at an angle may be equal to or less than 65 degree angle with respect to the axis of rotation 119. Alternatively, the locking surface 370 may extend axially outward at an angle ranging between 35 and 65 degrees. However, it is envisioned that the locking surface 370 can extend outward at an angle between 0 and 90 degrees without departing from the scope of the disclosure. Together, the transition surface 364 and the locking surface 370 form a recess 368, having a flattened "V" configuration. The recess 368 defines an interlocking formation 361.

Clamping plates 380 in the second embodiment may each have a clamping portion 390 that interlocks with a respective one of the side surfaces 354 of the rim members 350 to interlock the clamping plates 380 and rim members 350. The clamping portion 390 may include a second transition surface 392 extending radially and axially inward at an angle with respect to the axis of rotation 119. As depicted in FIG. 12, angle 393 may be equal to or less than 65 degrees with respect to a line parallel to the axis of rotation 119. In one configuration, the second transition surface 392 may extend inward at an angle between about 25 and about 65 degrees. However, it is envisioned that the second transition surface 392 can extend inward at an angle between 0 and 90 degrees without departing from the scope of the disclosure. A second locking surface 396 may extend radially inward and axially outward from the second transition surface 392. As depicted in FIG. 12, the second locking surface 396 extends axially outward at an angle equal to or less than 65 degrees with respect to the axis of rotation 119. In one configuration, the second locking surface 396 may extend axially outward at an angle between 35 and 65 degrees. However, it is envisioned that the second locking surface 396 can extend axially outward at an angle between 0 and 90 degrees without departing from the scope of the disclosure. Together, the second transition surface 392 and the second locking surface 396 form a protrusion 398. The protrusion defines an interlocking formation 361.

The connection between the rim members 350 and clamping plates 380 in the second embodiment may be defined by engaging the recess 368 in the rim members 350 with the protrusions 398 on the clamping plates 380.

In another aspect of this disclosure, the distance 397 between the rim member 350 and the hub 328 of an unloaded rim member 350 may be set to limit the compression of, and hence, the energy absorbed by, at least a portion of the dampening member 310. In other words, dampening member 310 initially receives a load applied to the rim member 350 and undergoes compression. When the distance 397 is closed and the rim member 350 abuts the hub 328, a portion of the load is transferred directly between the rim member 350 and the hub 328 further limiting compression of the dampening member 310.

Controlling distance 397 may be used to extend the useful life of the dampening member 310 by preventing at least a portion of the dampening member 310 from reaching the yield point of the material of the dampening member 310 or experiencing plastic deformation. Alternatively, the distance 397 may be set to permit limited plastic deformation. As shown, the distance 397 may range from 40% to 60% the thickness 399 of the dampening member 310. In other configurations, the distance 397 may range from 25% to 75% the thickness 399 of the dampening member 310, while in others; the distance 397 may range from 10% to 90% the thickness 399 of the dampening member 310. Of course, setting the distance 397 to limit compression is optional.

Figure 13:
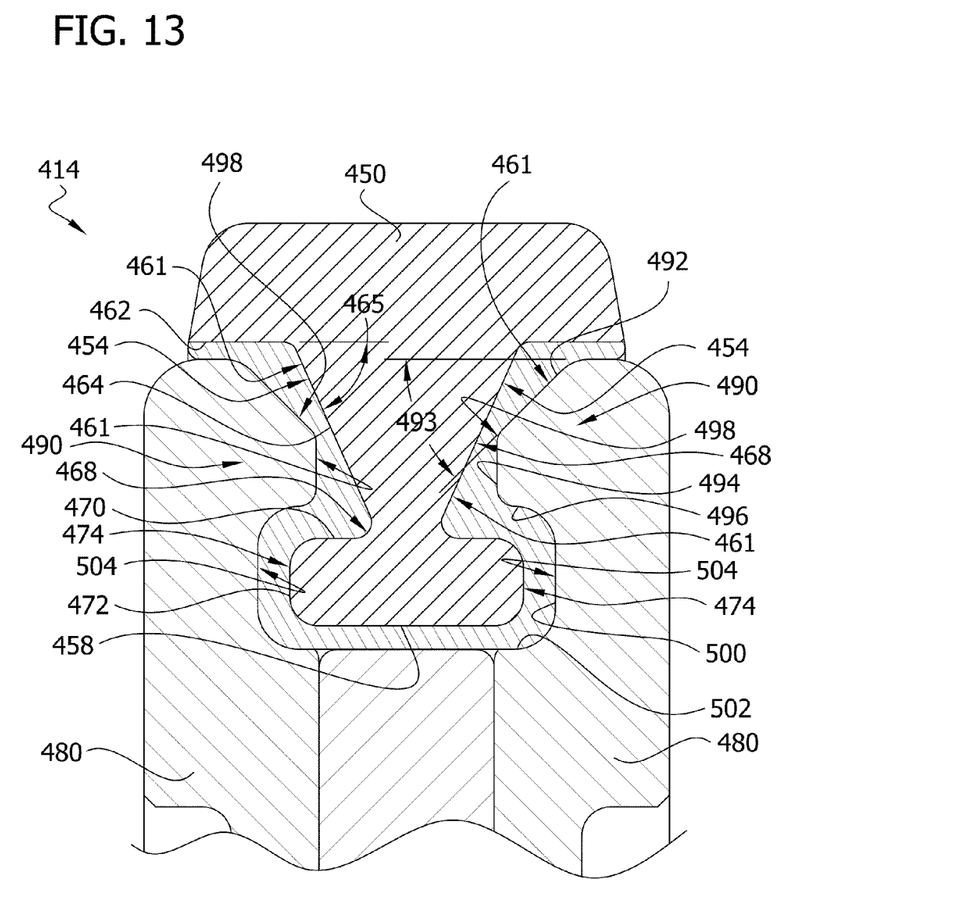
FIG. 13 is an enlarged fragmentary section of a third embodiment of the idler.

FIG. 13 illustrates a third embodiment of the idler 414. The side surfaces 454 may include a transition surface 464 extending radially and axially inward from a shoulder 462. As depicted in FIG. 13, angle 465 is shown at an angle of about 55 degrees with respect to a line parallel to the axis of rotation 119. In one configuration, the transition surface 464 may extend inward at an angle ranging between 0 degrees and 55 degrees. A locking surface 470 may extend axially outward from the transition surface 464, generally parallel to the axis of rotation 119. Together, the transition surface 464 and the locking surface 470 form a recess 468. A side portion 472 may extend radially inward from the locking surface 470, generally perpendicular to the axis of rotation 119. An inner surface 458 may extend axially inward from the side portion 472. Together, the locking surface 470, side portion 472, and inner surface 458 form a protrusion 474. The protrusion and recess 468 may be individually or collectively considered an interlocking formation 461.

Clamping plates 480 in the third embodiment may each have a clamping portion 490 that joins with a respective one of the side surfaces 454 of the rim members 450 to interlock the clamping plates 480 and rim members 450. The clamping portion 490 may include a second transition surface 492 extending radially and axially inward at an angle 493 with respect to the axis of rotation. As depicted in FIG. 13, angle 493 may be about 35 degrees with respect to a line parallel to the axis of rotation 119. In one configuration, the second transition surface 492 can extend inward at an angle between 15 and 55 degrees. A first portion 494 may extend radially inward from the second transition surface 492, generally perpendicular to the axis of rotation 119. Together, the second transition surface 492 and the first portion 494 form a second protrusion 498. A second locking surface 496 may extend axially outward from the first portion 494, generally parallel to the axis of rotation 119. A second portion 500 may extend radially inward from the second locking surface 496, generally perpendicular to the axis of rotation 119. A third portion 502 may extend axially inward from the second portion 500, generally parallel to the axis or rotation 119. Together, the second locking surface 496 and second and third portions 500, 502 form a second recess 504. The second protrusion 498 and second recess 504 may be individually or collectively considered an interlocking formation 461.

INDUSTRIAL APPLICABILITY

In general, the idler of the disclosure provides sound suppression by damping the shock impact between the track bushings and the idler during movement of a track-type machine. More specifically, as a track chain travels around the idler, the bushings sequentially impact the rim members. The dampening member, which is interposed between the rim members, clamping plates, and flange, compresses from the impact of the bushings on the rim member and limits the noise generated from the track undercarriage.

In some configurations, the bearing surface has a chordal length that is less than or equal to the track pitch. Such a configuration may facilitate sound reduction because only one bushing may contact the bearing surface of a particular rim member at a time. In contrast, if two bushings contact the bearing surface, the sound generated by the second bushing may be damped to a lesser degree because the dampening member may already be under compression from the first bushing.

Optionally, this compression may be controlled by providing that the distance between the rim member and the hub of an unloaded rim member is less than the overall thickness of the damping member to limit the compression of at least a portion of the dampening member. Thus, as each bushing impacts on the idler, the damping member compresses to initially absorb energy until the distance is closed and the trim member abuts the hub and the load is transferred directly to the hub through the rim member. Consequently, the useful life of the dampening member may be extended by preventing at least a portion of the dampening member from yielding and experiencing plastic deformation. For example, the distance may range from 40% to 60% the thickness of the dampening member. In other configurations, the distance may range from 25% to 75% the thickness of the dampening member, while in others; the distance may range from 10% to 90% the thickness of the dampening member.

The rim members and clamping plates may restrict movement of the rim members with respect to the hub in the radial and axial directions, as well as, about the circumference of the hub. Additionally, the shoulder and locking surface on the rim members and the second locking surface on the clamping plates may cooperate to reduce the wear on the dampening member caused by sheer stresses from the sliding of the rim members with respect to the clamping plates. In one configuration, the angle for the transition surface is 45 degrees. In another, the angle may be less than 65 degrees, while in others; the angle may range from 15 to 55 degrees or 25 to 65 degrees. An angle greater than 65 degrees increases the sheer stress on the dampening material to levels that may result in premature failure. In the event that the dampening members wear away, the locking surfaces are arranged such that they overlap each other to couple the rim members to the hub.

The ribs may support the clamping plates against loads placed on the rim members. As a result, the bolts may be substantially shielded from shear stress caused by the impact of the bushings with the rim members, which may extend the life of the bolts and facilitate disassembly of the idler after a period of use.

Disposing the dampening member between the end surfaces of the adjacent rim members may dampen the "see-saw" or rocking motion of the rim members with respect to each other as a bushing engages and moves over the bearing surface of the rim member. Disposing the dampening member between the side surfaces and the clamping plates may also prevent dirt from entering the interior components of the idler. This feature may also reduce wear and corrosion of the idler.

By providing the mounting portion separate from the wear portion on the clamping plates, the bolts may be protected from wear by the track links. The wear portion includes that portion of the clamping plates where the track links extend from the perimeter of the idler a distance that is less than the spacing of the bolts from the perimeter of the idler. Wear to the wear portion of the clamping plates may occur when the side loads are applied to the track chain. Such loading may occur as the machine is being turned or when the machine is traversing an inclined surface. Since the bolts are located away from the wear portion, the wear on the bolts from the track links may be prevented. Consequently, nondestructive disassembly of the idler may be facilitated when the clamping plates are near or at the end of their useful life. As a result, the viable use of the idler may be prolonged.

The rim members, clamping plates and dampening member may be replaceable without removing the hub from the track-type machine. For example, the bolts may be unscrewed and the clamping plates removed from the flange. The rim elements may then be removed from the flange as well. After the rim elements are removed, they may be discarded, refurbished, or recycled. Once all the parts have been removed from the hub, they may be serviced or replaced with new parts and connected to the hub. Consequently, service time and cost may be reduced.

What is claimed is:

1. An idler having an axis of rotation, the idler comprising:
   a hub having a flange;
   a plurality of rim members positioned along a perimeter of the flange and including side surfaces, and inner surfaces at least one of the side surfaces including a first interlocking formation, and at least one of the inner surfaces including a connector element that connects to the perimeter of the flange;
   a clamping plate connected to the flange, the clamping plate including a second interlocking formation interlocked with the first interlocking formation; and
   a dampening member interposed between the first and second interlocking formations.

2. The idler as set forth in claim 1, wherein the first interlocking formation includes one of a protrusion and a recess, and the second interlocking formation includes the other of the protrusion and the recess, the protrusion being received in the recess to interlock the plurality of rim members with the flange, the protrusion and the recess each including a transition surface extending at an angle less than or equal to 65 degrees with respect to the axis of rotation of the idler, the first and second interlocking formations including a locking surface extending in a plane generally parallel to the axis of rotation.

3. The idler as set forth in claim 1, wherein the plurality of rim members is encased by the dampening member.

4. The idler as set forth in claim 1, wherein the dampening member is disposed between adjacent ones of the plurality of rim members.

5. The idler as set forth in claim 1, for use in a track-type undercarriage including a track comprising interconnected track links and bushings, the bushings being separated from each other along the track by a track pitch, each rim member including a bearing surface having a chordal length less than or equal to the track pitch.

6. The idler as set forth in claim 5, wherein the clamping plate includes a mounting portion and a wear portion, bolts received through the mounting portion and the flange connect the clamping plate to the flange, the wear portion positioned to engage the track, the mounting portion and bolts being located away from the wear portion.

7. The idler as set forth in claim 1, further comprising a rib extending axially outward from the hub, wherein the rib is disposed to support the clamping plate.

8. A rim element for an idler including an axis of rotation and a hub, the rim element comprising:
   a rim member including a bearing surface and side surfaces extending from the bearing surface and directed generally axially when the rim element is mounted on the perimeter of a flange of the idler, the side surfaces including an interlocking formation including at least one of a protrusion and a recess, the side surfaces also including a locking surface;
   a dampening member fixed to at least one of the side surfaces of the rim member, wherein the dampening member encases the rim member.

9. The rim element as set forth in claim 8, wherein the interlocking formation includes a transition surface extending at an angle to the axis of rotation of the idler.

10. The rim element as set forth in claim 9, wherein the angle of each of the transition surfaces is less than about 65 degrees.

11. The rim element as set forth in claim 8, wherein the dampening member is disposed on an end surface of the rim member.

12. The rim element as set forth in claim 8, wherein the rim member includes an inner surface facing radially inward of the idler when the rim member is mounted on the perimeter of a flange of the idler, and a first connector element on the inner surface of the rim member being adapted to engage a second connector element on the idler for cooperating to inhibit movement of the rim member about the hub, the first connector element comprising a tab projecting radially inward from the inner surface of the rim member.

13. The rim element as set forth in claim 8, wherein the interlocking formation is shaped to restrict radial and axial movement of the rim element relative to the hub when the rim element is connected to the hub.

14. An idler having an axis of rotation, the idler comprising:
   a hub having a flange;
   a plurality of rim members positioned along a perimeter of the flange, at least one of the rim members including:
      a side surface including a first interlocking formation; and
      an inner surface including a connector element for mounting the at least one rim member on the perimeter of the flange;
   a clamping plate connected to the flange, the clamping plate including a second interlocking formation; and
   a dampening member interposed between the first and second interlocking formations.

15. The idler as set forth in claim 14, wherein the rim members are encapsulated by the dampening member.

16. The idler as set forth in claim 14, wherein the connector element extends radially into the flange.

17. The idler as set forth in claim 14, wherein the first interlocking formation of the rim member interlocks with the second interlocking formation of the clamping plate.

* * * * *